United States Patent
Kanamori

(10) Patent No.: US 6,631,209 B1
(45) Date of Patent: *Oct. 7, 2003

(54) IMAGE PROCESSING SYSTEM

(75) Inventor: Keiko Kanamori, Kawasaki (JP)

(73) Assignees: Kabushiki Kaisha Toshiba, Kawasaki (JP); Toshiba Tec Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,849

(22) Filed: Sep. 7, 1999

(30) Foreign Application Priority Data

Sep. 7, 1998 (JP) .......................... 10-252677

(51) Int. Cl.[7] ................................ G06K 9/00
(52) U.S. Cl. .................... 382/169; 358/461; 382/274
(58) Field of Search ................. 382/169, 274, 382/168, 171, 176, 270–273; 348/672; 358/462, 453, 465, 466, 447, 452

(56) References Cited

U.S. PATENT DOCUMENTS

| | | | |
|---|---|---|---|
| 5,055,944 A | 10/1991 | Shibahara | 358/465 |
| 5,267,053 A | 11/1993 | Potucek et al. | 358/446 |
| 5,581,370 A | 12/1996 | Fuss et al. | 358/447 |
| 5,657,395 A | 8/1997 | Hirota | 382/163 |
| 5,689,582 A * | 11/1997 | Murakami | 382/176 |
| 5,848,182 A | 12/1998 | Kanamori | 382/171 |
| 5,883,973 A * | 3/1999 | Pascovici et al. | 382/169 |

FOREIGN PATENT DOCUMENTS

| | | |
|---|---|---|
| EP | 0 557 099 | 8/1993 |
| EP | 0 578 875 | 1/1994 |
| JP | 63-184473 | 7/1988 |
| JP | 8-181862 | 7/1996 |
| JP | 10-164368 | 6/1998 |

OTHER PUBLICATIONS

Stewart. "Calculus: Early Transcendentals." Chapter 4.1, p. 254–260. Brooks/Cole Publishing Co., 1995.*

* cited by examiner

*Primary Examiner*—Amelia M. Au
*Assistant Examiner*—Colin LaRose
(74) *Attorney, Agent, or Firm*—Foley & Lardner

(57) ABSTRACT

A histogram preparing portion prepares a density histogram based on input image data. A reference value calculating and correcting portion calculates a white reference value and a black reference value for adjusting density on the basis of the density histogram. A reference value determining portion corrects one of the white reference value and the black reference value such that the black reference value is necessarily greater than the white reference value. An automatic density adjusting portion adjust the density of the input image data with the corrected white or black reference value. Thus, automatic adjustment for removing a background or darkening a light letter can be performed suitably without failure, so that a clear image can be provided.

7 Claims, 7 Drawing Sheets

IMAGE PROCESSING SYSTEM

BACKGROUND OF THE INVENTION

The present invention relates to an image processing system applied to an image processing apparatus, for example, a digital copying machine to which an image of an original read by means of a scanner is input, and which subjects the input image to predetermined image processes, such as a density adjusting process, and outputs the processed image onto a paper sheet by means of an electrophotography laser printer.

Generally, in an image processing apparatus such as a digital copying machine for treating image data, image data is read from an original by image reading means, e.g., a scanner, and digitized. The digital image data is processed in accordance with the purpose, multileveled, and output through image output means, e.g., a laser printer. At this time, even if the image data read by the scanner includes a background portion of the original or the letters in the original are light-colored, the density of the print can be automatically adjusted so as to be suited for the original by a density adjusting function without manual adjustment using a density adjustment button.

Recently, as the density adjusting function, a method is developed, in which a density histogram is made on the basis of the input image data, the kind of the input original (whether the background is light or dark) is determined on the basis of the characteristic value of the density histogram, a reference value is obtained from the result of the determination, and the density of the input image data is adjusted in accordance with the reference value.

A reference value means a value used for automatically adjusting the density of an image by means of the characteristic value of an original. A white reference value is obtained for adjusting the density of a background and a black reference value is obtained for adjusting the density of a letter. An image density is adjusted by means of the two reference values. However, if the two reference values are very close, the density of lightly printed letters may be uneven, or a dark background cannot be removed and may remain like noise in places. In this case, the image quality may often be deteriorated.

Further, since the range for determining a white reference value cannot overlap the range for determining a black reference value, the dark background cannot be completely removed or a light-colored letter cannot be darkened.

BRIEF SUMMARY OF THE INVENTION

Accordingly, an object of the present invention is to provide an image processing method, by which automatic adjustment for removing a background or darkening a light letter can be performed suitably without failure.

In order to achieve the above object, according to one aspect of the present invention, there is provided an image processing method comprising the steps of:
preparing a density histogram from input image data;
calculating a first white reference value and a first black reference value for adjusting density of the input image data based on the density histogram;
providing a final white reference value and a final black reference value by correcting at least one of the first white reference value and the first black reference value such that the first black reference value is at least a predetermined value greater than the first white reference value; and
adjusting the density of the input image data based on the final white reference value and the final black reference value.

The calculating step includes: calculating a second white reference value by giving a first offset to the first white reference value; and calculating a second black reference value by giving a second offset to the first black reference value, and the providing step includes: comparing the second white reference value with the second black reference value; and providing the final black reference value by adding a predetermined density value to the second white reference value and providing the second white reference value as the final white reference value, if, as a result of the comparing, the second black reference value is smaller than a sum of the second white reference value and a constant value.

The calculating step includes: calculating as the first white reference value a density having a maximum frequency in a first predetermined density range for determining a white reference value; and calculating as the first black reference value a density having a maximum frequency in a second predetermined density range for determining a black reference value, wherein the first and the second predetermined density ranges partially overlap.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification illustrate presently preferred embodiments of the invention, and together with the general description given above and the detailed description of the preferred embodiments given below, serve to explain the principles of the invention.

FIGS. 10A and 10B are diagrams for explaining ranges for determining a white reference value and a black reference value in a case where the original has a dark background, in which FIG. 10A shows the conventional art and FIG. 10B shows the present invention;

FIGS. 11A and 11B are diagrams for explaining ranges for determining a white reference value and a black reference value in a case where the original has light letters, in which FIG. 11A shows the conventional art and FIG. 11B shows the present invention.

DETAILED DESCRIPTION OF THE INVENTION

An embodiment of the present invention will be described with reference to the accompanying drawings.

Figure 1:
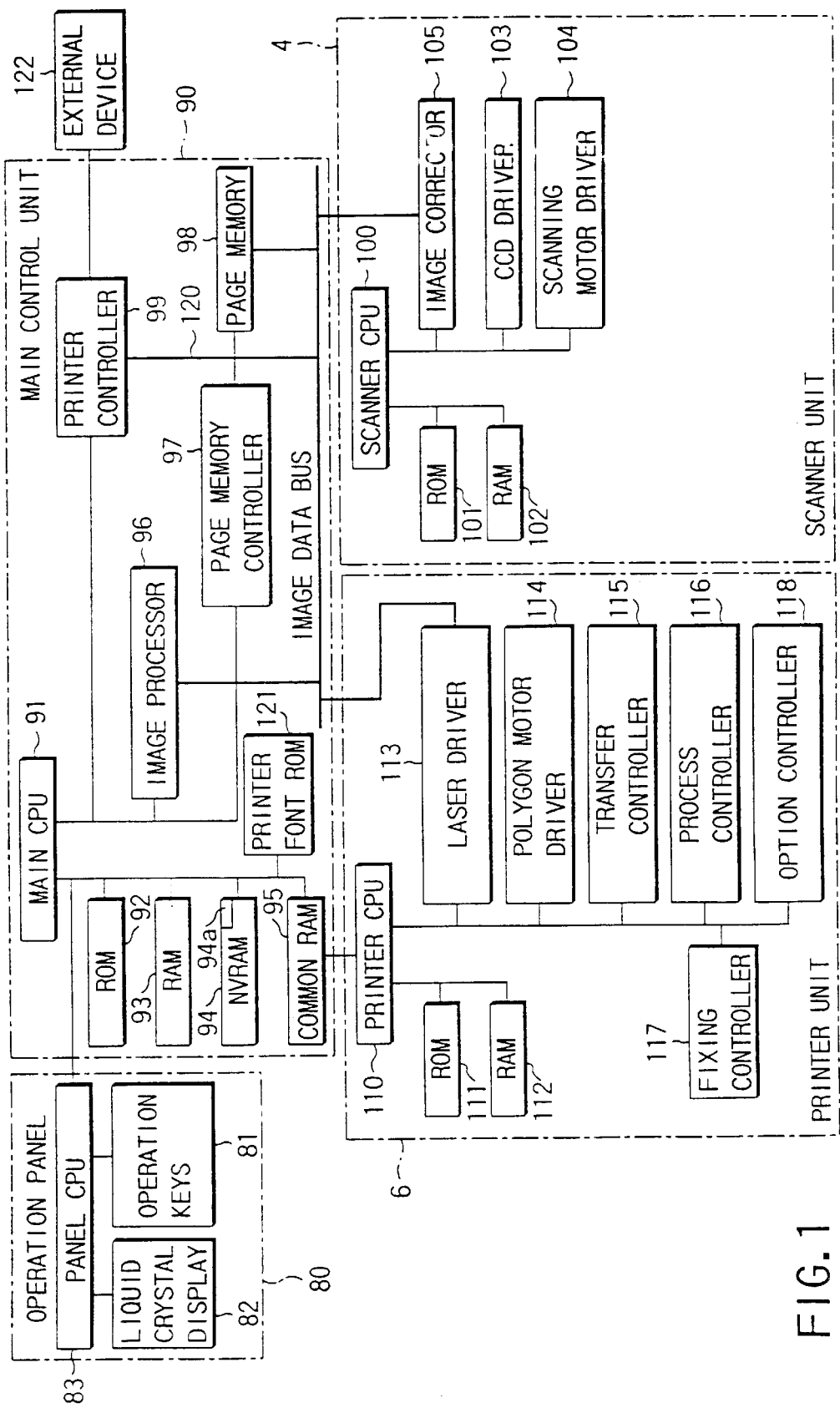
FIG. 1 is a block diagram showing the structure of a digital copying machine to which an image processing method of the present invention is applied.

FIG. 1 is a block diagram showing the structure of a digital copying machine to which an image processing method of the present invention is applied. Referring to FIG. 1, the control system of the present invention is constituted by three CPUs (central processing units): a main CPU 91 in a main control unit 90, a scanner CPU 100 in a scanner unit 4 and a printer CPU 110 in a printer unit 6.

The main CPU 91 and the printer CPU 110 perform bidirectional communications via a common RAM 95. The main CPU 91 transmits operation instructions to the printer CPU 110, and the printer CPU 110 transmits a status signal in return. The printer CPU 110 and the scanner CPU 100 perform serial communications, in which the printer CPU 110 transmits operation instructions to the scanner CPU 100 and the scanner CPU 100 transmits a status signal in return.

An operation panel 80 includes various operation keys 81, a liquid crystal display 82, and a panel CPU 83 connected to them. The panel CPU 83 is connected to the main CPU 91.

The main control unit 90 comprises the main CPU 91, a ROM 92, a RAM 93, a NVRAM (nonvolatile RAM) 94, the common RAM 95, an image processor 96, a page memory controller 97, a page memory 98, a printer controller 99, and a printer font ROM 121.

The main CPU 91 controls the overall operations. The ROM 92 stores control programs and the like. The RAM 93 temporarily stores data.

The NVRAM 94, namely a nonvolatile memory backed up by a battery (not shown), can maintain stored data, even if the power source is turned off. The NVRAM includes a storage portion 94a for storing white and black reference values characteristic of the present invention.

The common RAM 95 is used to perform bidirectional communications between the main CPU 91 and the printer CPU 110.

The page memory controller 97 writes or reads image data in or from the page memory 98. The page memory 98 has a memory area which can store image data of a plurality of pages, so that compressed data of image data supplied from the scanner unit 4 is stored in a page-by-page manner.

The printer font ROM 121 stores font data corresponding to print data. The printer controller 99 develops print data supplied from an external device 122, such as a personal computer, to image data by means of the font data stored in the printer font ROM 121 with a resolution corresponding to the data representing the resolution appended to the print data.

The scanner unit 4, image reading means for reading an image from the original, comprises: the scanner CPU 100 for controlling the scanner unit; a ROM 101 storing control programs and the like; a RAM 102 for storing data; a CCD driver 103 for driving a line sensor for photo-electrically converting light reflected from the original to an electric signal; a scanning motor driver 104 for controlling rotation of a scanning motor for moving an exposure lamp for radiating light to the original and moving a mirror for guiding the light reflected from the original to the line sensor; and an image corrector 105.

The image corrector 105 comprises: an A/D converter for converting an analog signal from the line sensor to a digital signal; a shading correction circuit for correcting a change in threshold level of an output signal output from the line sensor due to variation in the line sensor or a change in ambient temperature; and a line memory for temporarily storing a shading-corrected digital signal output from the shading correction circuit.

The printer unit 6, image output means for outputting an image onto a paper sheet, comprises: the printer CPU 110 for controlling the printer unit; a ROM 111 storing control programs and the like; a RAM 112 for storing data; a laser driver 113 for driving a semiconductor laser oscillator; a polygon motor driver 114 for driving a polygon motor of a laser exposure device for exposing a photosensitive drum; a transfer controller 115 for controlling transfer of a paper sheet through a transfer path; a process controller 116 for controlling processes of electrifying, developing and transferring the photosensitive drum by means of an electrifying charger, a developer and a transferring charger; a fixing controller 117 for controlling a fixing device; and an option controller 118 for controlling options.

The image processor 96, the page memory 98, the printer controller 99, the image corrector 105 and the laser driver 113 are connected to one another through a image data bus 120.

Figure 2:
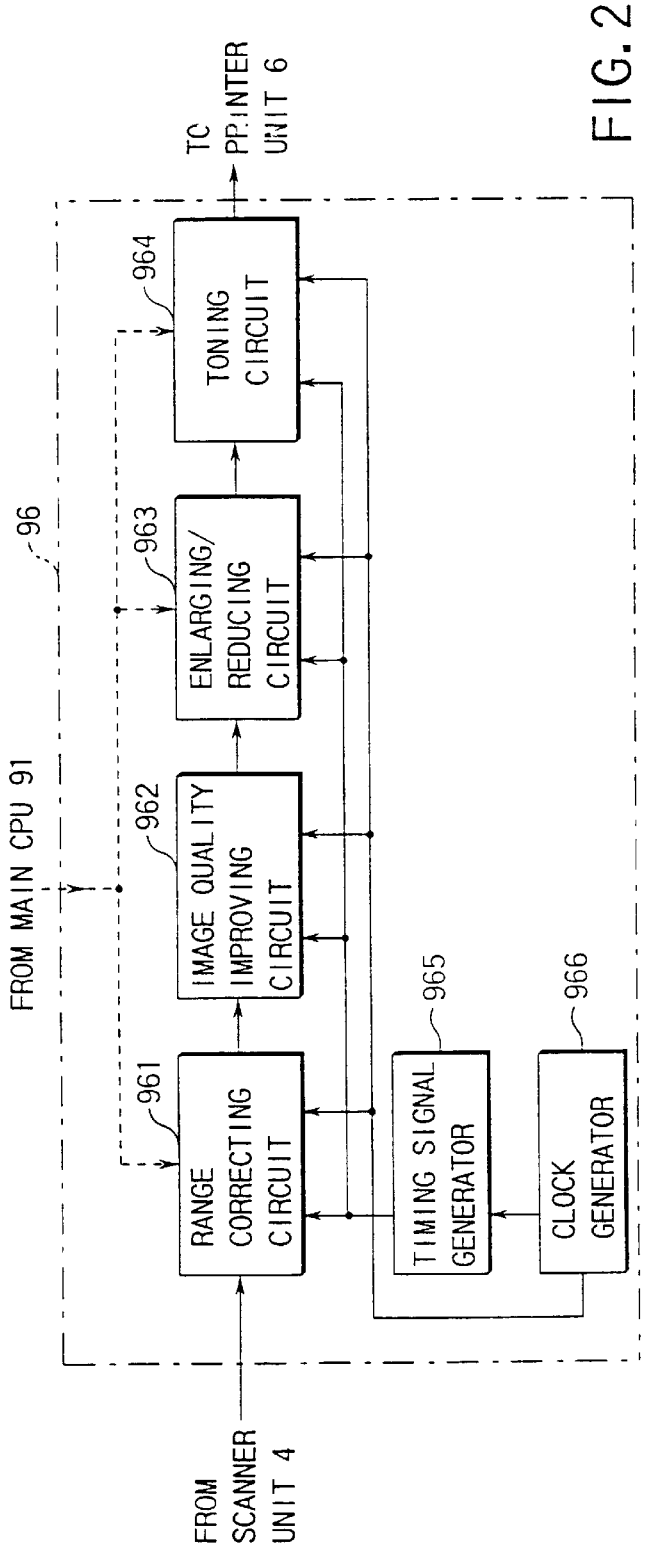
FIG. 2 is a block diagram showing the structure of an image processor.

The image processor 96 performs various image processes with respect to image data mainly read by the scanner 4. For example, as shown in FIG. 2, it comprises a range correcting circuit 961, an image quality improving circuit 962, an enlarging/reducing circuit 963, a toning circuit 964, a timing signal generator 965, a clock generator 966, etc.

The range correcting circuit 961 corrects the density range of a process target of input image data, as will be detailed later. The image quality improving circuit 962 performs an image quality improving process with respect to the corrected image data supplied from the range correcting circuit 961. The enlarging/reducing circuit 963 enlarges or reduces the quality-improved image data supplied from the image quality improving circuit 962. The toning circuit 964 tones the image data supplied from the enlarging/reducing circuit 963.

The timing signal generator 965 generates various timing signals and supplies them to the range correcting circuit 961, the image quality improving circuit 962, the enlarging/reducing circuit 963, and the toning circuit 964.

The clock generating circuit 966 generates various clock signals, and supplies them to the range correcting circuit 961, the image quality improving circuit 962, the enlarging/reducing circuit 963, the toning circuit 964 and the timing signal generating circuit 965.

Figure 3:
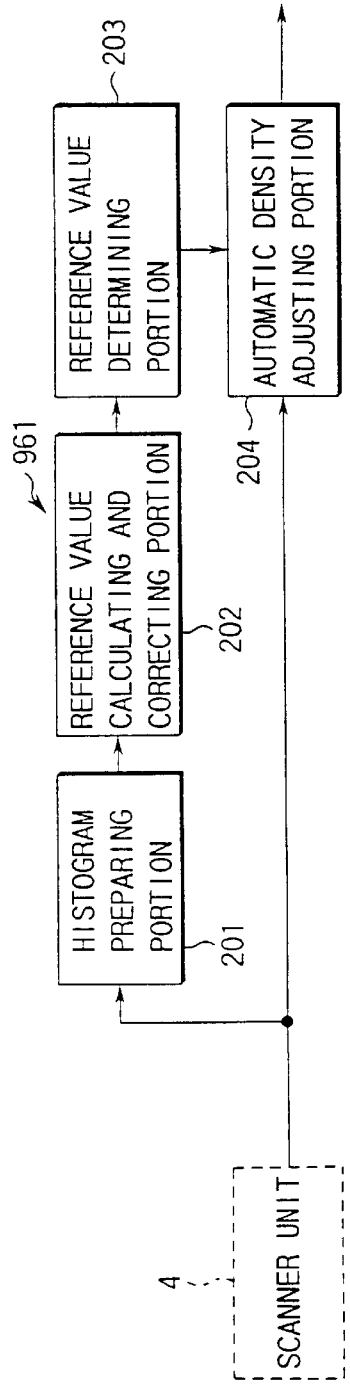
FIG. 3 is a block diagram showing details of a range correcting circuit.

FIG. 3 shows a detailed structure of the range correcting circuit 961. The range correcting circuit 961 comprises: a histogram preparing portion 201 for preparing a density histogram based on the image data supplied from the scanner unit 4; a reference value calculating and correcting portion 202 for calculating and correcting a white reference value and a black reference value for adjusting the density based on the density histogram made by the histogram preparing portion 201; a reference value determining portion 203 for determining final white and black reference values based on the white and the black reference values calculated by the reference value calculating and correcting portion 202; and an automatic density adjusting portion 204 for adjusting the density of the image data supplied from the scanner unit 204 by means of the white and the black reference values determined by the reference value determining portion 203.

Figure 4:
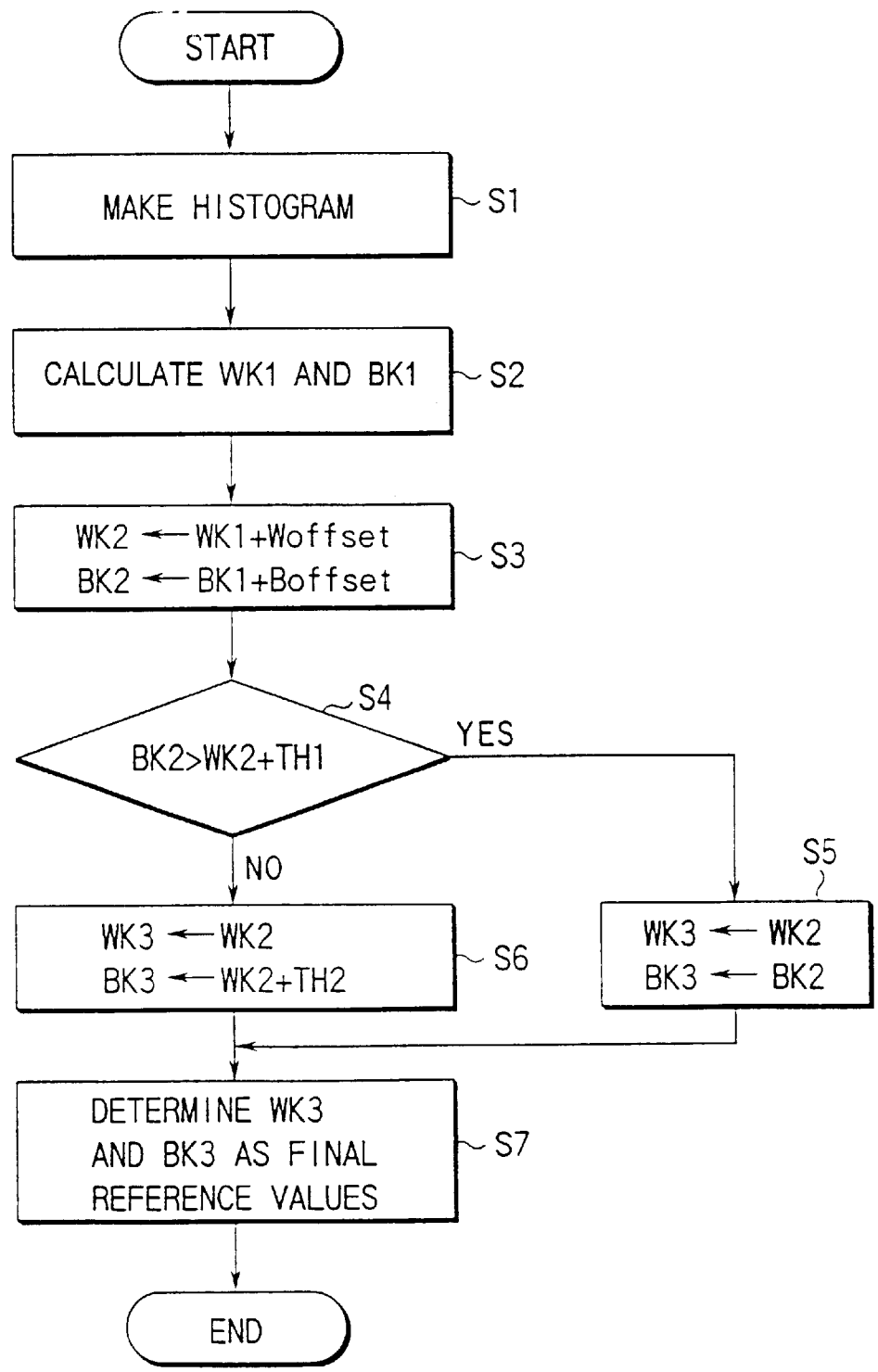
FIG. 4 is a flowchart illustrating a range correcting process according to the present invention.

An operation of the range correcting circuit 961 having the above structure will now be described. FIG. 4 is a flowchart illustrating a range correcting process according to the present invention. Since the levels of image data are generally 8 bits (256 level), the image data of the 8-bit levels will be described below.

First, the histogram preparing portion 201 receives digital image data read from the original by the scanner unit 4 and multi-valued to 8 bits. It prepares a density histogram in which an abscissa represents a density and an ordinate represents an appearance frequency of a pixel having the density, and outputs a density histogram signal (Step S1 in FIG. 4).

Figure 5:
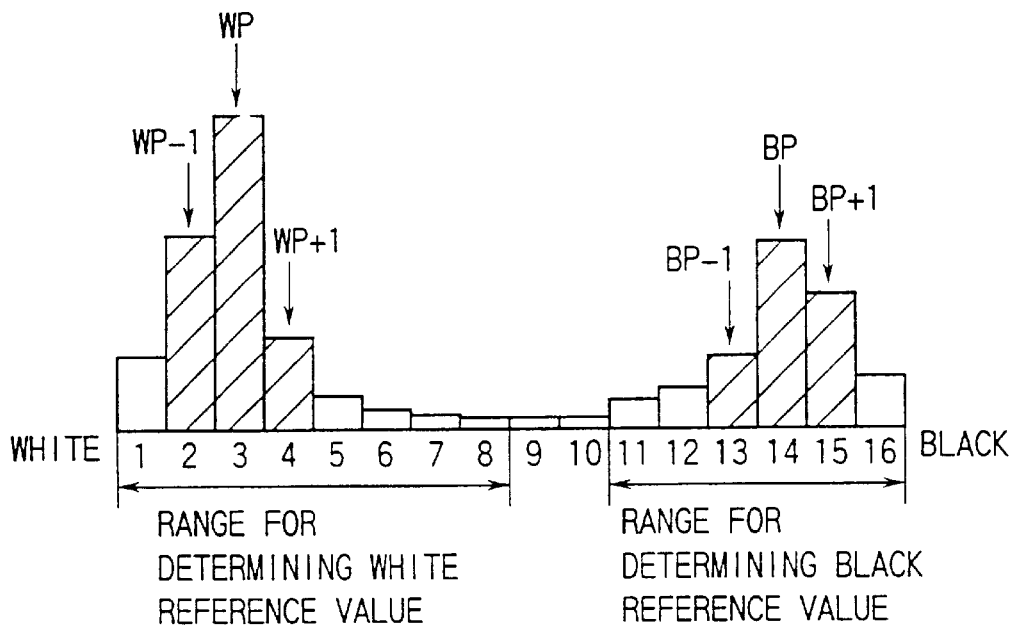
FIG. 5 is an example of the density histogram representing 16 levels of density of input image data.

FIG. 5 shows an example of the density histogram. The accuracy of the abscissa must be selected in accordance with the purpose. In the following description, the accuracy is assumed to be 4 bits (16 levels). The 8-bit density data supplied from the scanner unit 4 is converted to 4-bit density data to prepare a density histogram. For example, the density level "1" represents density data of 00h (hex) to 0Fh. Therefore, the frequency (the height along the vertical axis) of the level "1" represents the sum of the numbers of pixels having the densities 00h to 0Fh.

The reference value calculating and correcting portion 202 calculates a reference value for use in an automatic density adjusting process based on the density histogram signal supplied from the histogram preparing portion 201. The reference value calculating and correcting portion 202 first detects the density level WP ("313" in FIG. 5) of the maximum frequency of the predetermined range for determining a white reference value (generally, the density range of the background), and the density level BP ("14" in FIG. 5) of the maximum frequency of the predetermined range for determining a black reference value (generally, the density range of letters) (Step S2 in FIG. 4). The ranges for determining the white and the black reference values are prestored in the storage portion 94a of the NVRAM 94. The density levels WP and BP, and the like, are hereinafter referred to as peak positions.

In general, to delete a background of an original having a relatively high density, such as a newspaper, a white reference value is determined to fall under the range between a level 1 and, for example, a level 9, a comparatively high level as a background density. To delete a background of an original having a relatively low density, such as a white paper, a white reference value is determined to fall under the range between the level 1 and, for example, a level 6, a comparatively low level. As regards a black reference value, to darkly print a comparatively light letter written by, for example, a pencil, a black reference value is determined to fall under the range between a level 9, a comparatively low level as a letter density, and a level 16. In the case of an original which does not include a light letter, a black reference value is determined to fall under the range between a level 11, a comparatively high level, and the level 16. In general, the ranges for determining white and black reference values are set so as not overlap. However, according to the present invention, the ranges can overlap, as will be described later with reference to FIGS. 10B and 11B.

Then, the reference value calculating and correcting portion 202 calculates a white reference value WK1 and a black reference value BK1 (Step S2 in FIG. 4) as provisional reference values based on the peak positions WP and BP, from the following formulas (1). The formulas (1) represent reference values in the case of FIG. 5.

$$WK1 = (WP-1) \times \frac{256}{16} + \frac{16}{2} + \frac{H(WP+1) - H(WP-1)}{H(WP)} \times \frac{16}{2} \quad (1)$$

$$BK1 = (BP-1) \times \frac{256}{16} + \frac{16}{2} + \frac{H(BP+1) - H(BP-1)}{H(BP)} \times \frac{16}{2}$$

(WK1: a white reference value (8-bit density value),

BK1: a black reference value (8-bit density value),

WP: a density value having the maximum frequency in the range of the background density (4 bits), BP: a density value having the maximum frequency in the range of the letter density (4 bits), H (WP): a frequency of WP, H (WP−1): a frequency of (WP−1), H (WP+1): a frequency of (WP+1), H (BP): a frequency of BP, H (BP+1): a frequency of (BP+1), H (BP+1): a frequency of (BP+1).)

In general, the value of 4 bits corresponds to any of numerals "0" and "15". In the above formulas (1), each of the density values WP and BP corresponds to any of numerals "1" to "16", which are determined to correspond to the 16 levels "1" to "16" shown in FIG. 5 as a matter of convenience.

The density of the histogram is expressed by 4 bits. However, by means of the above formulas, the density value having a peak frequency, such as the white reference value WP1 or the black reference value BP1, can be expressed by 8 bits.

Figure 6:
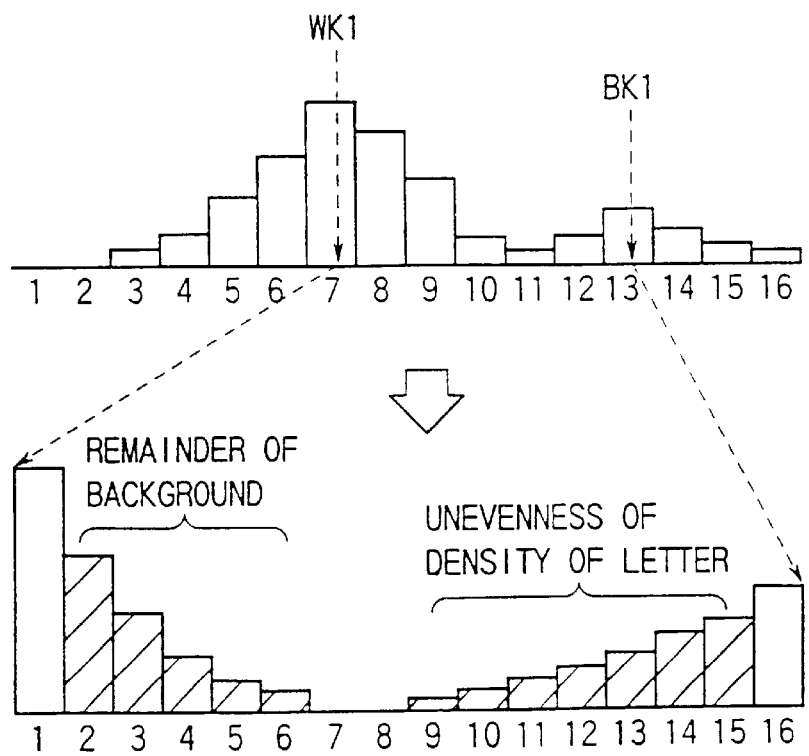
FIG. 6 is a diagram for explaining a problem which occurs in a case where peak values calculated from the density histogram are subjected to re-normalization.

Then, the values of WK1 of the peak position of the background and BK1 of the peak position of the letter, corrected by means of the above formulas, are subjected to a density adjusting process, so that WK1 and BK1 are respectively adjusted to 0 and FF (WK1=0 and BK1=FF (hex)) as shown in FIG. 6. After the process, skirt portions remain on the central sides of the peaks of the histogram. Thus, the background is not completely removed. In addition, since the distribution of the letter density is wider than that before the density is adjusted, the unevenness of the density of letters occurs or is emphasized.

Figure 7:
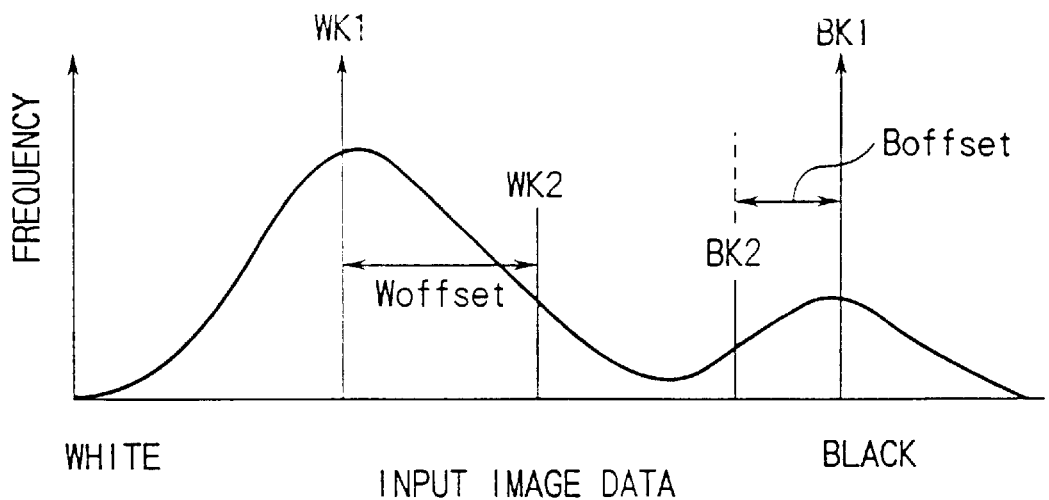
FIG. 7 is a diagram for explaining a process of calculating a reference value.

To solve this problem, as shown in FIG. 7, offsets are given to WK1 and BK1, thereby correcting (altering) the provisional reference values WK1 and BK1 (Step S3 in FIG. 4). The offsets are obtained experimentally or experientially. In general, to remove the background and darken the letter, while eliminating the unevenness of the density, a positive offset value is given to the white reference value WK1 and a negative offset value is given to the reference value BK1. However, depending on the purpose, both the offset values may be positive or negative. For example, a photograph made of half-tone pixels can be printed more clearly, if a positive offset is given to a black reference value BK1.

The reference value calculating and correcting portion 202 corrects the provisional reference values WK1 and BK1 with offset values $W_{offset}$ and $B_{offset}$ based on the following formulas (2), and outputs the corrected reference values WK2 and BK2.

$$WK2 = WK1 + W_{offset}$$

$$BK2 = BK1 + B_{offset} \quad (2)$$

When the white reference value WK2 and the black reference value BK2 are obtained as described above, if the two values WK2 and BK2 are too close and if the automatic density adjustment as shown in FIG. 6 is carried out, the intermediate density data between the two values WK2 and BK2 may be extended widely. As a result, the intermediate density data may be distributed in a wide range of density. In this case, a region of the print where the density is darker than that of the corresponding region of the original looks like a noise, resulting in deterioration in the quality of the image.

Figure 8:
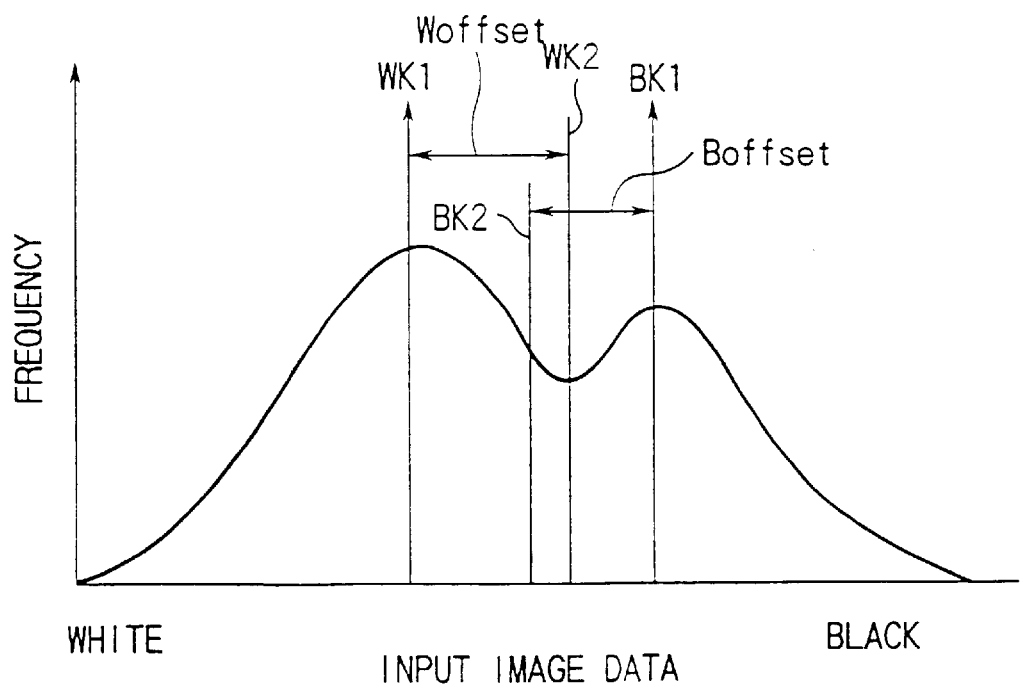
FIG. 8 is a diagram for explaining a process of calculating a reference value.
Figure 9:
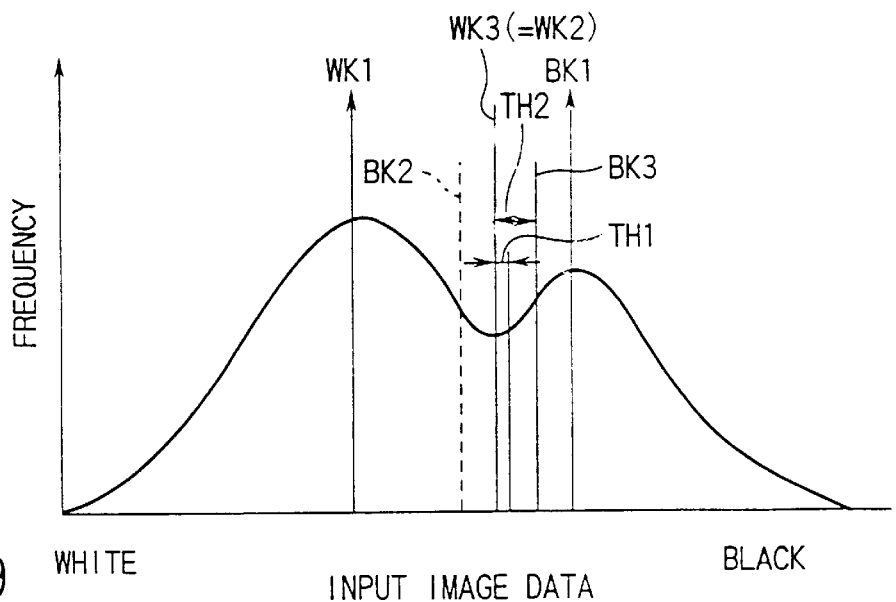
FIG. 9 is a diagram for explaining a process of calculating a reference value.

Basically, when offsets are given, it is necessary that the white reference value be always smaller than the black reference value, in view of the sense of the white reference value and the black reference value. For this reason, according to the conventional art, the range for determining a white reference value and the range for determining a black reference could not overlap, on the assumption of various histograms of originals. If they are allowed to overlap, as shown in FIG. 8, a white reference value may be greater than a black reference value, depending on conditions of offsets. In this case, the automatic density adjustment cannot function normally.

To avoid this, the reference value determining portion 203 further corrects the reference values WK2 and BK2 calculated by the reference value calculating and correcting portion 202 based on the following formulas (3), and determines and outputs final reference values WK3 and BK3 (Steps S6 and S7 in FIG. 4).

White Reference Value: $WK3=WK2$

Black Reference Value: $BK3=WK2+TH2$, if $BK2<WK2+TH1$,
$BK3=BK2$, in the other cases (3)

(TH1: a first predetermined density width,
TH2: a second predetermined density width.)

More specifically, if the white reference value WK2 is greater than the black reference value BK2, or the difference between WK2 and BK2 is smaller than the first predetermined density width TH1, the second predetermined density width TH2 is added to the white reference value WK2, thereby determining a final black reference value BK3. Therefore, the black reference value BK3 is at least a predetermined value greater than a white reference value WK3. This very simple correction can solve the aforementioned problem of the remainder of the background or the unevenness of density of letters, which may occur when the two values WK2 and BK2 are too close.

Further, since the black reference value is necessarily set greater than the white reference value, the range for determining the white reference value may overlap the range for determining the black reference value shown in FIG. 5. As a result, the range for determining the white reference value can be extended as shown in FIGS. 10B and 11B, so that a dark background portion can be surely detected. Therefore, the background can be removed easily. Similarly, the range for determining the black reference value can be extended, so that a light letter can be surely detected. Therefore, the light letter can be darkly printed.

Figure 10A:
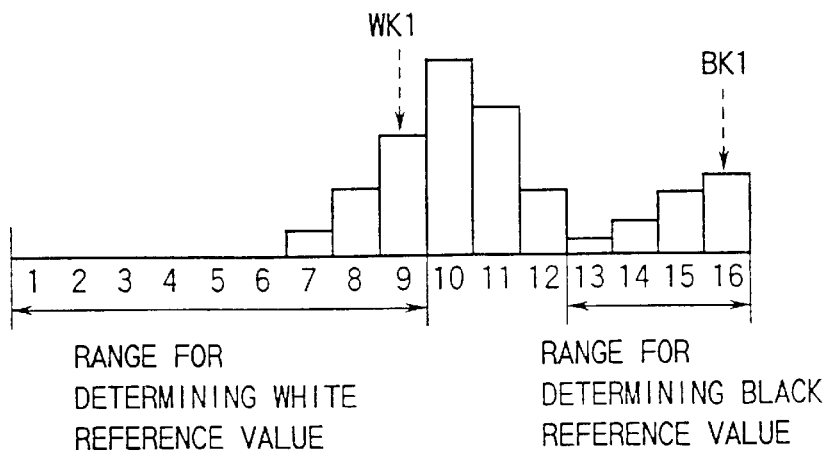
Figure 10B:
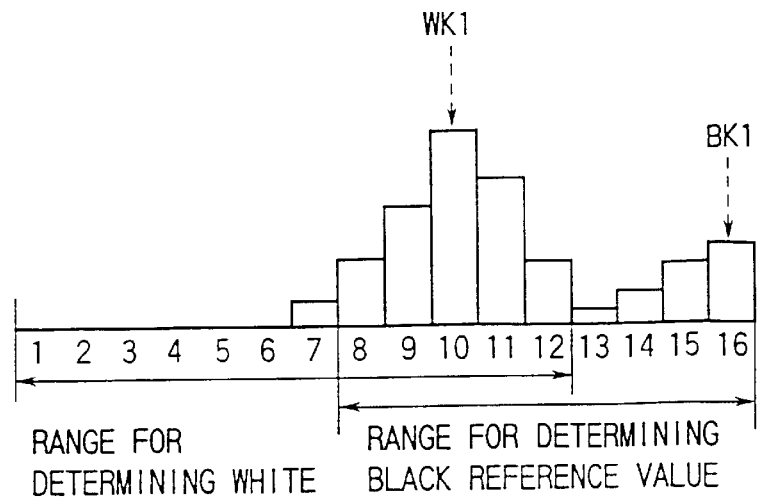
Figure 11A:
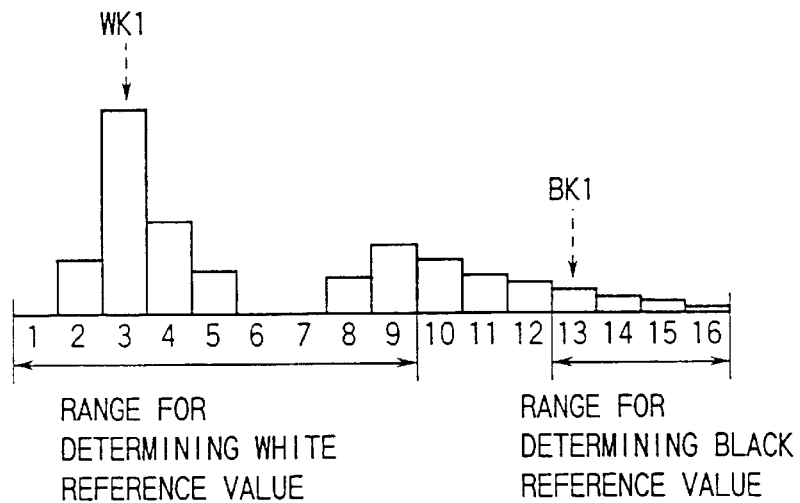
Figure 11B:
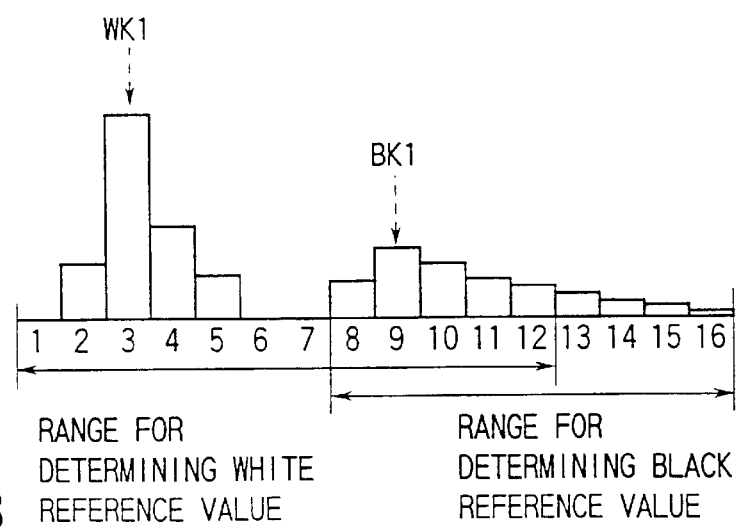

FIGS. 10A and 10B show a case where the original has a dark background. FIGS. 11A and 11B show a case where the original has light letters. FIGS. 10A and 11A show ranges for determining a white reference value and a black reference value according to the conventional art. FIGS. 10B and 11B show ranges for determining a white reference value and a black reference value according to the present invention.

If ranges for determining a white reference value and a black reference are not permitted to overlap as shown in FIGS. 10A and 11A, the ranges must be relatively narrow. As a result, the white and the black reference values cannot be set to suitable values.

As described above, the reference value determining portion 203 determines and outputs the white reference value WK3 and the black reference value BK3, which are finally used for the process.

The automatic density adjusting portion 204 carries out an operation of the following formula (4), so that the image data supplied from the scanner 4 can be subjected to a density adjusting process using the white reference value WK3 and the black reference value BK3 determined by the reference value determining portion 203.

$$D' = \frac{D - WK3}{BK3 - WK3} \times FFh \quad (4)$$

(D: an image density before automatic density adjustment,
D': an image density after automatic density adjustment,
WK3: a white reference value used in the automatic density adjustment,
BK3: a black reference value used in the automatic density adjustment.)

Figure 12:
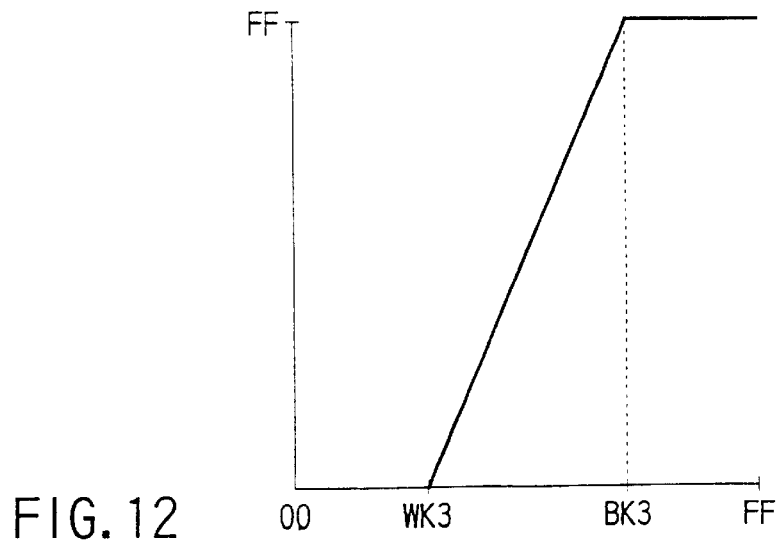
FIG. 12 is a diagram for explaining an operation of the automatic density adjusting unit.

When the density adjustment as expressed by the above formula (4) is carried out, the image data output from the scanner unit 4 is converted as shown in FIG. 12. In FIG. 12, an abscissa represents an image density before the automatic density adjustment, and an ordinate represents an image density after automatic density adjustment. As shown in the diagram, the density of every pixel having a density of WK3 or lower is converted to "00h", and the density of every pixel having a density of BK3 or higher is converted to "FFh". The density of a pixel having a density between WK3 and BK3 is converted to a density between "00h" and "FFh".

The image data, the density of which is adjusted by the automatic density adjusting portion 204 in the manner described above, is supplied to a next processing unit. In the processing unit, the image data is subjected to an image process, such as filtering, and converted to binary data (or multi-valued data). Then, a laser beam modulated with the multi-valued data is generated from the semiconductor laser, and a static latent image is formed on the photosensitive drum.

As has been described above, the present invention can provide an image processing method, by which automatic adjustment for removing a background or darkening a light letter can be performed suitably without failure, so that a clear image can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising:
preparing a density histogram from input image data;
calculating a first white reference value and a first black reference value for adjusting density of the input image data based on the density histogram, the first white reference value WK1 and the first black reference value BK1 being of higher precision than the density value of the density histogram;

the first white reference value WK1 being calculated using H(WP), H(WP−1) and H(WP+1), where WP represents a density value having a maximum frequency in a background density region, H(WP) represents a frequency of pixels having density value WP, H(WP−1) represents a frequency of pixels having density value (WP−1), and H(WP+1) represents a frequency of pixels having density value (WP+1), the first black reference value BK1 being calculated using H(BP), H(BP+1). and H(BP+1), where BP represents a density value having a maximum frequency in a character density region, H(BP) represents a frequency of pixels having density value BP, H(BP+1) represents a frequency of pixels having density value (BP+1), and H(BP+1) represents a frequency of pixels having density value (BP+1);

providing a final white reference value and a final black reference value by correcting at least one of the first white reference value WK1 and the first black reference value BK1 such that the first black reference value BK1 is at least a predetermined value greater than the first white reference value WK1; and adjusting the density of the input image data based on the final white reference value and the final black reference value, wherein the adjusting the density adjusts the density of the image data based on the following equation:

$$D' = (D - WK3)/(BK3 - WK3),$$

wherein

D' is the density of the image data after being adjusted by the density adjusting means, D is the density of the image data prior to being adjusted by the density adjusting means, WK3 is the final white reference value, and BK3 is the final black reference value.

2. A method according to claim 1, wherein:

the calculating step includes:

calculating a second white reference value by adding or subtracting a first offset to or from the first white reference value; and calculating a second black reference value by adding or subtracting a second offset to or from the first black reference value, the providing step includes:

comparing the second white reference value with the second black reference value; and providing the final black reference value by adding a predetermined density value to the second white reference value and providing the second white reference value as the final white reference value, if, as a result of the comparing, the second black reference value is smaller than a sum of the second white reference value and a constant value.

3. A method according to claim 1, wherein the calculating step comprises:

calculating as the first white reference value WK1 a density having a maximum frequency in a first predetermined density range for determining a white reference value; and calculating as the first black reference value BK1 a density having a maximum frequency in a second predetermined density range for determining a black reference value, wherein the first and second predetermined density ranges partially overlap.

4. An image forming apparatus comprising:

reading means for reading an original image and providing image data corresponding to the original image;

preparing means for preparing a density histogram from the image data provided from the reading means;

storage means for storing a first predetermined density range for determining a white reference value and a second predetermined density range for determining a black reference value, the first and second predetermined density ranges partially overlapping;

calculating means for calculating a first white reference value and a first black reference value for adjusting density of the image data based on the density histogram prepared by the preparing means, said calculating means including first calculating means which calculates a density having a maximum frequency in the first predetermined density range as the first white reference value and second calculating means which calculates a density having a maximum frequency in the second predetermined density range as the first black reference value;

final reference value providing means for providing a final white reference value and a final black reference value by correcting at least one of the first white reference value and the first black reference value such that the first black reference value is at least a predetermined value greater than the first white reference value;

density adjusting means for adjusting the density of the image data based on the final white reference value and the final black reference value, a density value of an input pixel having a density equal to or lower than the final white reference value being converted to a minimum density value, a density value of an input pixel having a density equal to or greater than the final black reference value being converted to a maximum density value, and a density value of an input pixel having a density between the final white and black reference values being converted to a density value between the minimum and maximum density values; and image forming means for forming an image based on the image data, the density of which has been adjusted by the density adjusting means.

5. An apparatus according to claim 4, wherein:

the calculating means includes:

means for calculating a second white reference value by adding a first offset to the first white reference value; and means for calculating a second black reference value by subtracting a second offset from the first black reference value; and the final reference value providing means includes:

means for comparing the second white reference value with the second black reference value; and providing means for providing the final black reference value by adding a predetermined density value to the second white reference value and providing the second white reference value as the final white reference value, if, as a result of the comparing, the second black reference value is smaller than a sum of the second white reference value and a constant value.

6. An apparatus according to claims 4, further comprising:

storing means for storing a first predetermined density range for determining a white reference value and a second predetermined density range for determining a second reference value, the first and the second predetermined density ranges partially overlapping, wherein the calculating means includes means for calculating as the first white reference value WK1 a density having a maximum frequency in the first predetermined density range for determining a white reference value, and means for calculating as the first black reference value BK1 a density having a maximum frequency in the second predetermined density range for determining a black reference value.

7. An image forming apparatus comprising:

a reading unit configured to read an original image and providing image data corresponding to the original image;

a preparing unit configured to prepare a; density histogram from the image data provided from the reading unit;

a storage unit configured to store a first predetermined density range for determining a white reference value and a second predetermined density range for determining a black reference value, the first and second predetermined density ranges partially overlapping;

a calculating unit configured to calculate a first white reference value and a first black reference value for adjusting density of the image data based on the density histogram prepared by the preparing unit, said calculating unit configured to calculate a first density having a maximum frequency in the first predetermined density range as the first white reference value and a second density having a maximum frequency in the second predetermined density range as the first black reference value;

a final reference value providing unit configured to provide a final white reference value and a final black reference value by correcting at least one of the first white reference value and the first black reference value such that the first black reference value is at least a predetermined value greater than the first white reference value;

a density adjusting unit configured to adjust the density of the image data based on the final white reference value and the final black reference value, a density value of an input pixel having a density equal to or lower than the final white reference value being converted to a minimum density value, a density value of an input pixel having a density equal to or greater than the final black reference value being converted to a maximum density value, and a density value of an input pixel having a density between the final white and black reference values being converted to a density value between the minimum and maximum density values; and an image forming unit configured to form an image based on the image data, the density of which has been adjusted by the density adjusting unit, wherein the density adjusting unit adjusts.:.the density of the image data based on the following equation:

$$D'=(D-WK3)/(BK3-WK3),$$

wherein

D' is the density of the image data after being adjusted by the density adjusting unit, D is the density of the image data prior to being adjusted by the density adjusting unit, WK3 is the final white reference value, and BK3 is the final black reference value.

* * * * *